United States Patent [19]
Li

[11] Patent Number: 5,910,688
[45] Date of Patent: Jun. 8, 1999

[54] WINDMILL

[76] Inventor: Wan-Tsai Li, No. 4-9, Shetzu Village, Hsinwu Hsiang, Taoyuan, Taiwan

[21] Appl. No.: 08/854,292

[22] Filed: May 12, 1997

[51] Int. Cl.$^6$ .................................................... F03D 7/04
[52] U.S. Cl. ............................... 290/55; 290/44; 415/4.2
[58] Field of Search .................................. 290/43, 44, 54, 290/55; 415/2, 4.2; 417/334

[56] References Cited

U.S. PATENT DOCUMENTS

| | | |
|---|---|---|
| 504,301 | 8/1893 | Davies et al. . |
| 4,180,369 | 12/1979 | Ottosen ........................................ 415/2 |
| 4,447,738 | 5/1984 | Allison ....................................... 290/44 |
| 5,289,041 | 2/1994 | Holley ........................................ 290/44 |
| 5,457,346 | 10/1995 | Blumberg et al. ........................ 290/55 |
| 5,599,172 | 2/1997 | McCabe .................................... 417/334 |

Primary Examiner—Nestor Ramirez
Assistant Examiner—Nicholas Ponomarenko
Attorney, Agent, or Firm—W. Wayne Liauh

[57] ABSTRACT

An improvement for windmill includes a rotor unit, a transmission unit and a stabilizer. The rotor unit includes a plural number of blades with one end riveting to an annular outer ring and another end being twisted at an angle to engage with the slots formed in the hub of the rotor unit. The transmission unit includes a transmission box, an input shaft to receive wind generating power from the rotor unit and an output spindle for delivering output power for productive use. The stabilizer connects with the transmission unit at an opposite side to the rotor unit. The stabilizer has a tail fin for reducing the swaying of the windmill in the wind.

7 Claims, 3 Drawing Sheets

WINDMILL

BACKGROUND OF THE INVENTION

1. Field of the Invention

This invention relates to an improvement for windmill and particularly to a windmill which has a better wind receiving area design and can utilizes wind energy efficiently.

2. Description of the Prior Art

Nowadays, almost every country has been increasing its awareness in conservation and utilization of natural resources. Electricity generation and development is one of the most focused areas. The resources for electricity generation include hydraulic energy, wind energy, solar energy, coal, oil, nuclear power, and so on. Every resource has its advantages and disadvantages. For example, solar energy is available anywhere. However, an efficient solar cell is still under development, and facility for solar electricity is very expensive. Hydraulic power is highly geological dependent, and an extensive development is only restricted to a very limited area on earth. Fossil fuel electricity generation always creates severe environmental pollution. On the other hand, windmill energy is clean, safe, convenient and low-cost. Although it might not be suitable for generating large-scale power, it has great advantages for small-scale power generation anywhere on earth.

There are many different structural types of windmill. However, the blade design and the deployment of wind energy are similar. They may have some differences in the blade angle or guiding vane design, but the overall improvement in the efficiency of energy utilization is rather limited.

SUMMARY OF THE INVENTION

It is therefore an object of this invention to provide an improvement for windmill which can efficiently deploy wind power, and thus reduce the dependency on fossil fuel which usually creates pollution problems.

The windmill according to this invention includes a rotor unit, a transmission unit and a stabilizer. The rotor unit includes a plural number of specially shaped blades housed in a dish like frame for capturing wind power efficiently. The transmission unit includes a transmission box for transmitting wind energy captured from the rotor unit to an output shaft for power generation or other productive use. The stabilizer includes a tail fin for reducing the windmill from excessive swaying under wind flow so that the rotor unit can efficiently capture wind power.

It is another object of this invention to provide a windmill which has helical blades for efficiently capturing wind power and for reducing wind resistance.

It is yet another object of the present invention to provide a windmill in which the blades of the rotor unit is fixed between an outer ring and a hub of the rotor unit so that the blades are strongly supported. Such a structure enables the windmill to function normally in strong wind flow.

It is still another object of this invention to provide a windmill which consists of small number of components. The blades of the rotor unit is formed by simple process without precision casting or machining. Hence, the total cost of the windmill can be greatly reduced.

It is also an object of this invention to provide a blade structure which can transform the wind power into mechanical energy efficiently. Through the arrangement of the blades and their helical angles, the blade structure can perform productive wind receiving work.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
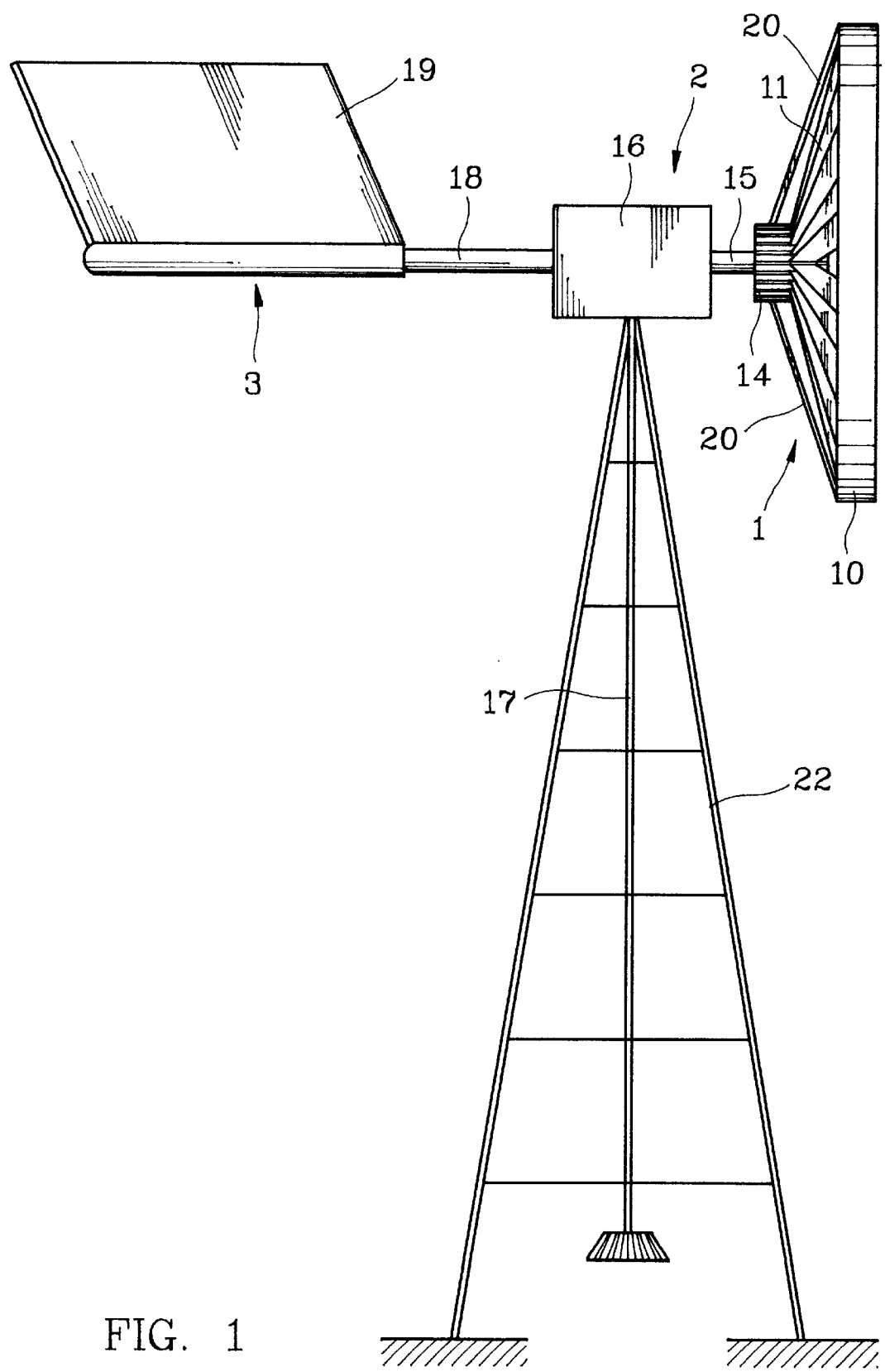
FIG. 1 is a perspective view of this invention.

Referring to FIG. 1, the windmill according to this invention includes a rotor unit 1, a stabilizer 3 and a transmission unit 2 located therebetween. The transmission unit 2 engages with the rotor unit 1 through a shaft 15 and engages with the stabilizer 3 through a tail bar 18. The transmission unit 2 is further supported by a tower rack 22 at an elevated location so that the windmill can function smoothly without being affected by the turbulent flow rising from the ground surface.

Figure 2B:
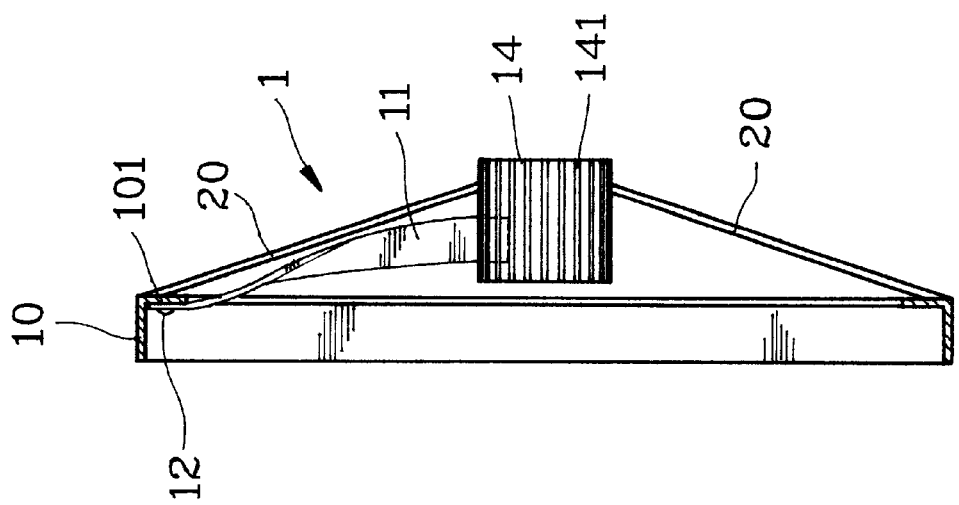
FIG. 2B is a side view of the blade and a rotor unit of this invention.
Figure 2A:
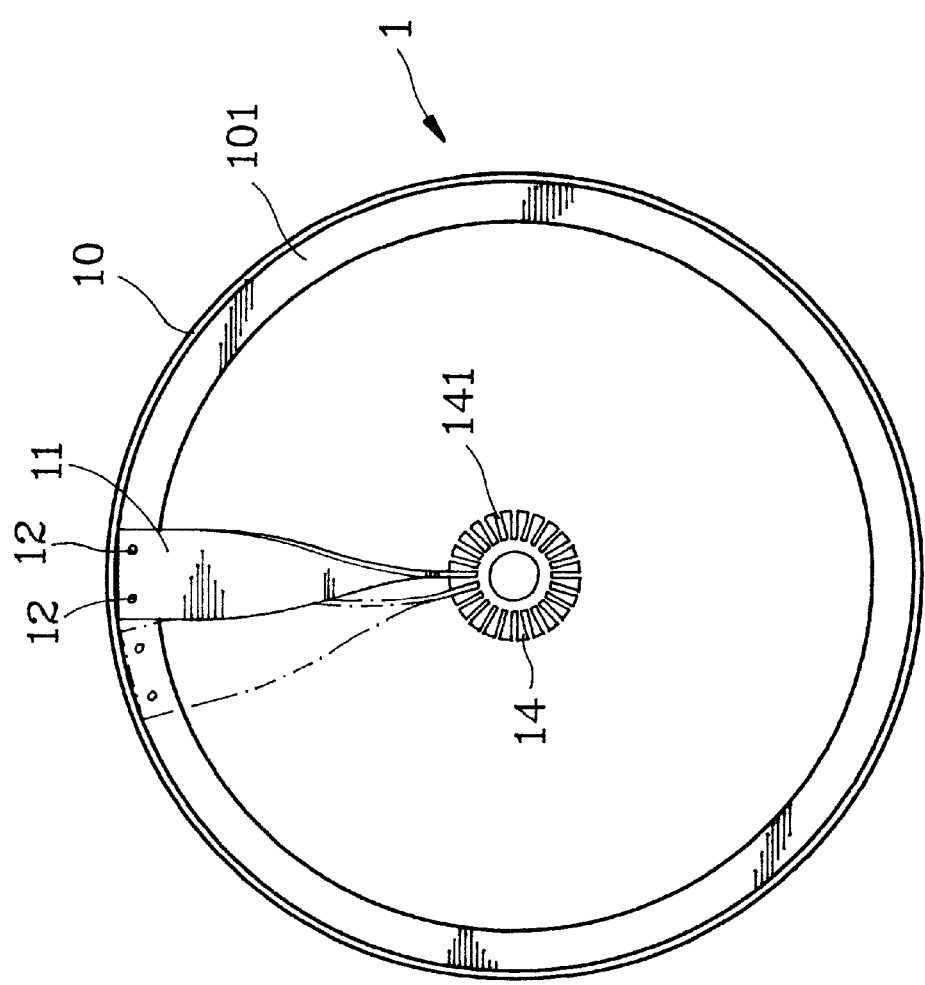
FIG. 2A is a front view of the blade and a rotor unit of this invention.

Referring to FIGS. 2A and 2B, the rotor unit 1 further includes a hub 14, an annular outer ring 10, at least two brackets 20 for supporting the outer ring 10 on the hub 14, and a plural number of blades 11.

The hub 14 is a hollow cylindrical member with an axial shaft opening inside engageable with one end of the shaft 15 and a plural number of axial slots 141 formed in the periphery thereof. The outer ring 10 is an annular ring with an L-shape cross section. The outer ring 10 and the hub 14 are coaxial and are formed in a dish-like profile with the brackets 20 set between them. Each blade 11 is fixed at one end on a flange 101 of the outer ring 10 by means of rivets 12. Another end of the blade 11 is twisted 90 degrees and fixedly engaged with the slot 141 of the hub 14. The rotor unit 1 set forth above can efficiently capture wind power and converts it to mechanical energy.

The transmission unit 2 with one end engaged with the rotor unit 1 via the shaft 15 includes a transmission box 16 and an output spindle 17 which receives the converted wind power from the transmission box 16 and delivers mechanical power for productive use, such as generating electricity, pumping water, etc.

The stabilizer 3, located beyond another end of the transmission unit 2, includes a tail bar 18 connecting to another end of the transmission unit 2 and at least a tail fin 19. In this embodiment shown in FIGS. 2A and 2B, a tail fin 19 is vertically positioned along the wind direction. Therefore the tail fin 19 is able to keep the rotor unit 1 face toward the wind direction and consequently enables the windmill to achieve better operation efficiency.

Figure 3:
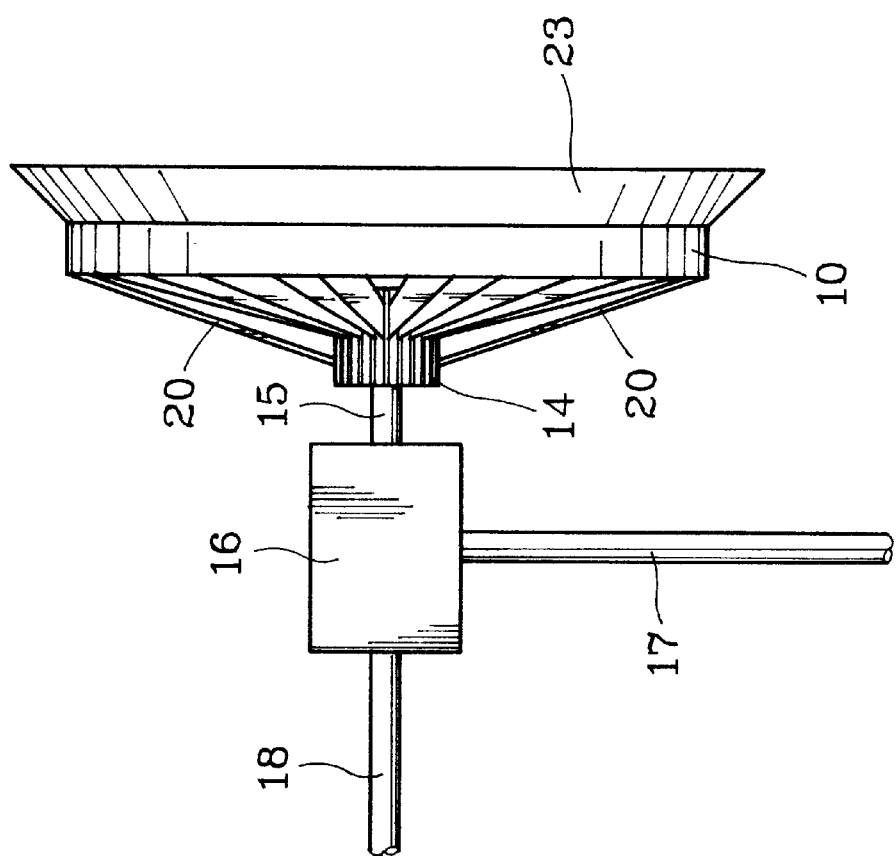
FIG. 3 is a side view of this invention including a funnel

FIG. 3 illustrates another embodiment of this invention. An annular-shaped funnel 23 is provided and is fixedly engaged with an outside rim of the outer ring 10. It can further improve wind capturing efficiency.

In summary, this invention provides a simple and low cost structure which can greatly increase wind capturing efficiency, and thus make wind energy utilization more practical and applicable.

Moreover, the rotor unit 1 of this invention can also apply to apparatus other than the windmill described above. Obviously, through the special arrangement of the blades, the rotor unit 1 can be utilized to any application which is designed to transform a flow power into a rotational mechanical energy.

It may thus be seen that the objects of the present invention set forth herein as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. An improvement for windmill comprising:

a rotor unit for converting wind energy to mechanical energy including a hollow cylindrical hub with an axial shaft opening and a plural number of axial slots formed in the periphery of the hub, an annular outer ring formed by an L-shaped cross section bar, at least two brackets for supporting the outer ring on the hub and a plural number of blades with one end thereof fixedly engaged with the outer ring and with another end thereof engaged with the slots in the hub;

a transmission unit for delivering output power received from the rotor unit including a transmission box with one end connecting with the rotor unit via a shaft and an output spindle located at another end thereof for delivering output power for productive use; and a stabilizer connected with the transmission unit at a third end thereof opposite to the rotor unit for reducing the swaying of the windmill in the wind.

2. An improvement of windmill of claim 1, wherein the blades are fixedly engaged with the outer ring by means of rivets.

3. An improvement of windmill of claim 1, wherein the blades are twisted at a 90 degree angle to engage with the slots in the hub.

4. An improvement of windmill of claim 1, wherein the transmission box is a gear box, the shaft is to receive input power and the output spindle is to deliver output power.

5. An improvement of windmill of claim 1, wherein the stabilizer further including at least a tail bar connecting with the third end of the transmission box and axially aligning with the shaft, and a tail fin disposed on the tail bar and vertically positioned along wind direction.

6. An improvement of windmill of claim 1, further having an annular funnel engaging with an outside rim of the outer ring.

7. A blade structure, for using with an application which is utilized to transform a flow power into a rotational mechanical energy via arrangement of the blades and their helical angle, comprising:

a hollow cylindrical hub with an axial shaft opening and a plural number of axial slots formed in the periphery of the hub;

an annular outer ring formed by an L-shaped cross section bar;

at least two brackets for supporting the outer ring on the hub; and a plural number of blades with one end thereof fixedly engaged with the outer ring and, after twisted 90 degree, with another end thereof engaged with the slots in the hub.

* * * * *